UNITED STATES PATENT OFFICE.

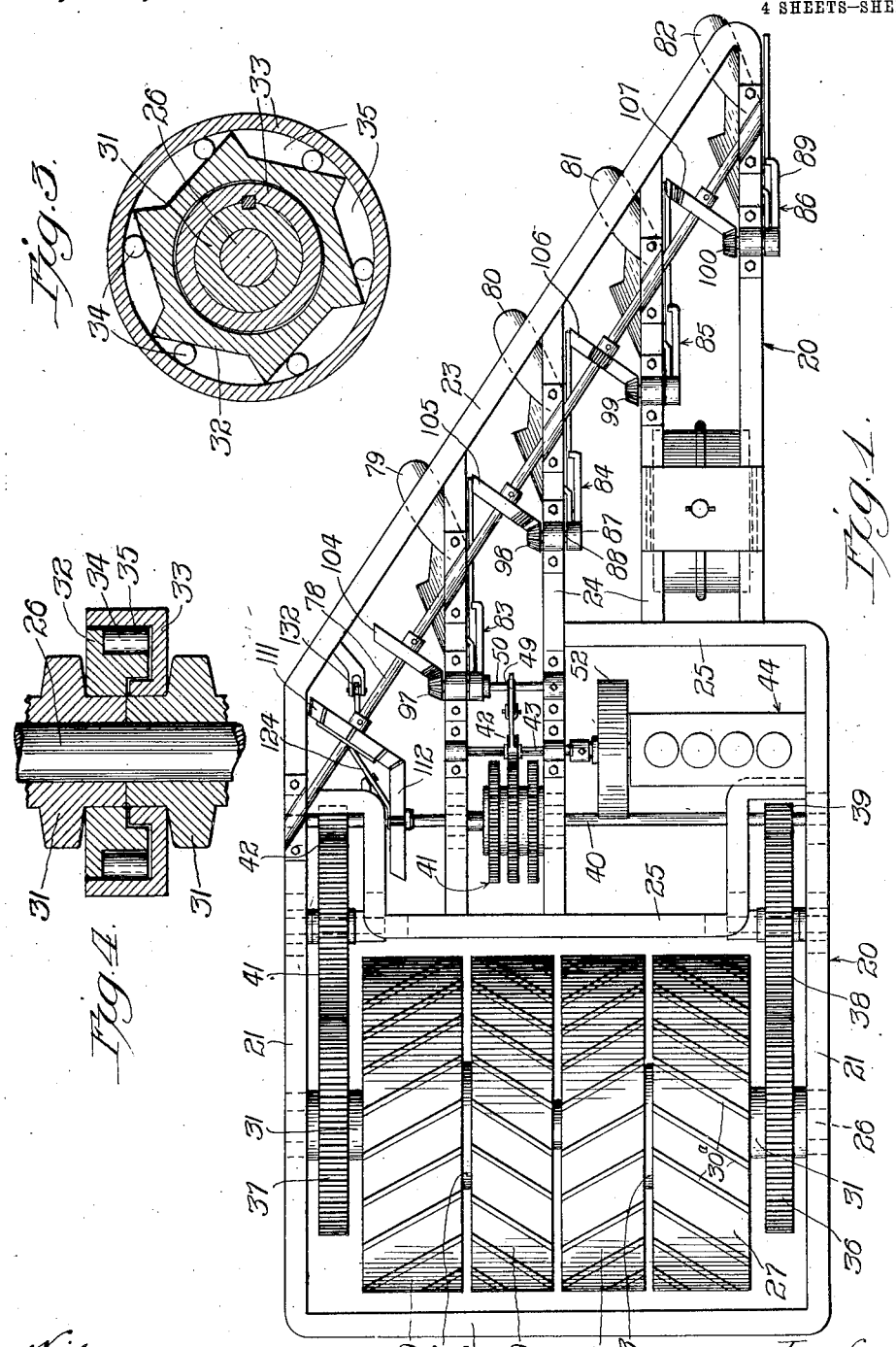

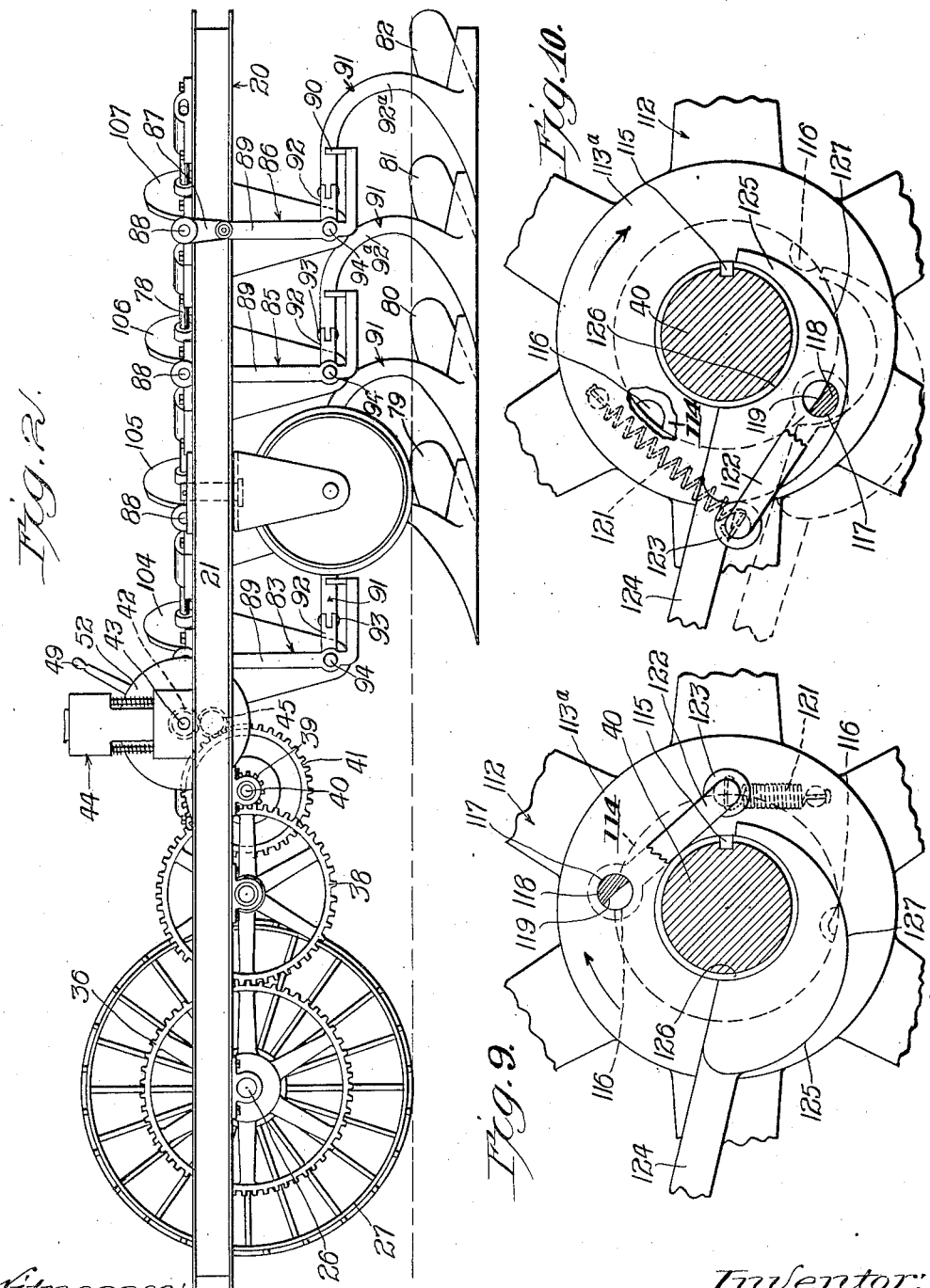

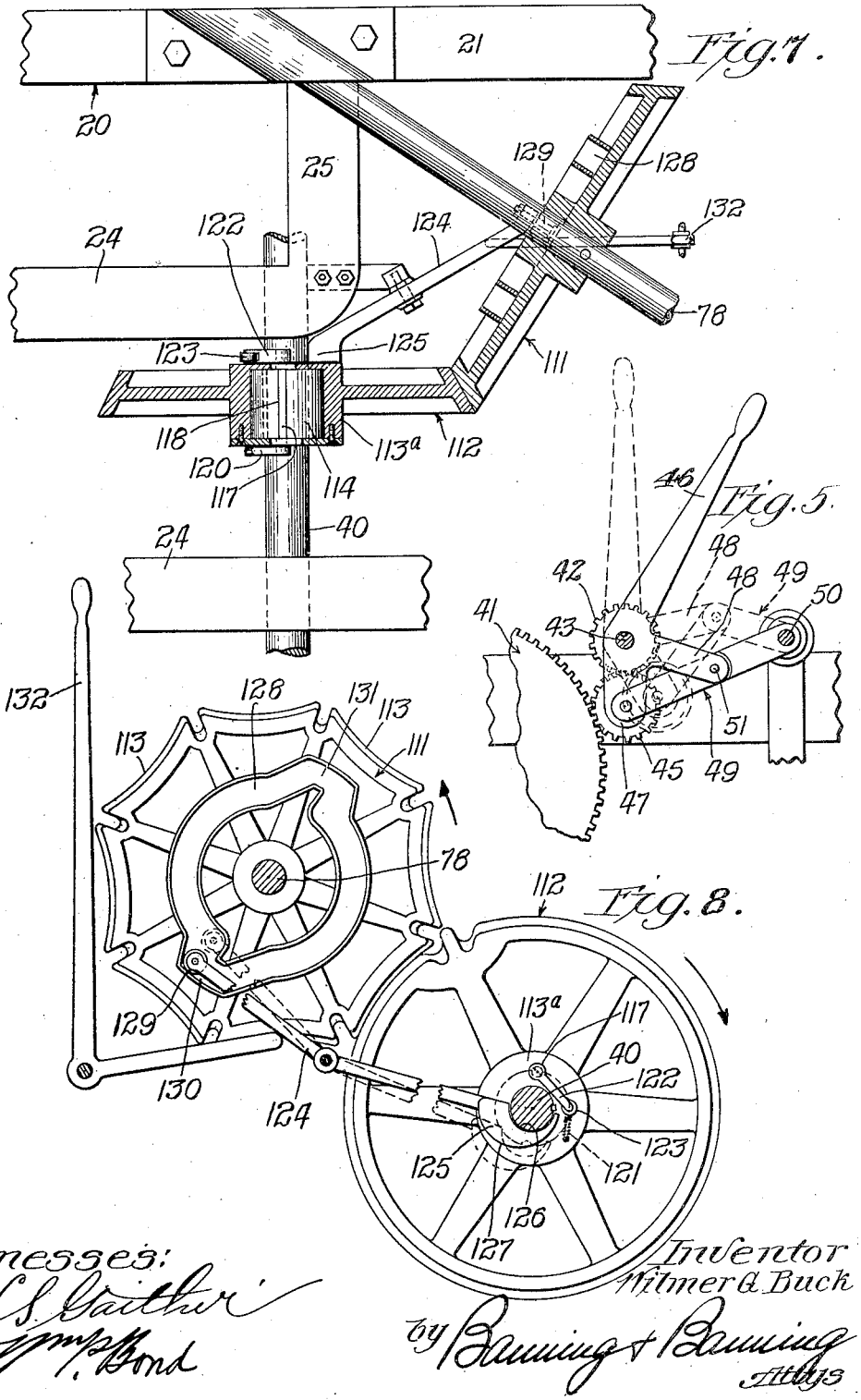

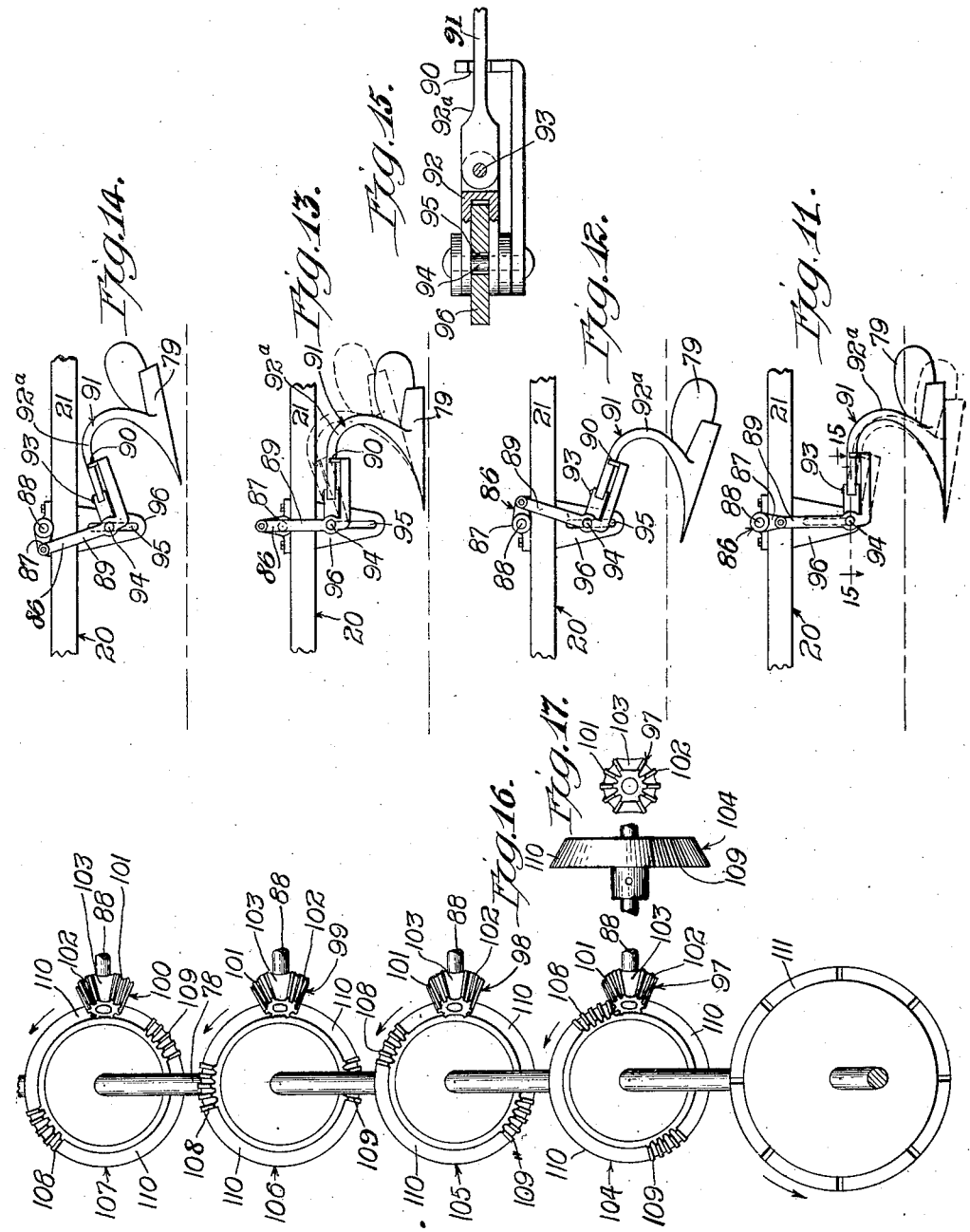

WILMER G. BUCK, OF WARREN, OHIO.

TRACTION-PLOW.

1,113,751.  Specification of Letters Patent.  Patented Oct. 13, 1914.

Application filed May 31, 1913. Serial No. 771,027.

*To all whom it may concern:*

Be it known that I, WILMER G. BUCK, a citizen of the United States, residing at Warren, in the county of Trumbull and State of Ohio, have invented certain new and useful Improvements in Traction-Plows, of which the following is a specification.

The present invention relates to several portions of the mechanism entering into and forming a traction plow of the type propelled by a suitable motor and carrying a series of plow bodies.

The objects of the present invention are, to arrange the traction wheels at the front of the plow; and to provide means for placing a direct drive on a portion of these traction wheels, allowing the remainder to be idle, and thus effecting a turning of the plow body through the action of the traction wheels.

A further object of the invention is to arrange these traction wheels with a clutch mechanism between each wheel, thus permitting the rotation of all of the wheels in the same direction under certain circumstances, and to permit a rotation of a portion of the wheels under certain other circumstances.

A further object of the invention lies in the production of a novel arrangement for shifting the main driving gear of the differential gear connection between the main driving shaft and the driven shaft for the traction wheels, and in providing means for locking said main driving gear in and out of engaging position.

A further object of the invention lies in a novel arrangement of the mechanism for lifting and lowering the plows whereby an initial movement is given each plow tilting the point thereof upward, and then a further movement given the plows lifting them bodily upward, and during the lowering operation an initial movement is given to each plow, directing its point downward, which is followed by a further movement that bodily lowers the plow to the ground.

A further object of the invention lies in the arrangement of the mechanisms for actuating this raising and lowering mechanism, whereby said raising and lowering mechanisms are operated in successive order, thus making a successive displacement of the plows from the ground and a successive lowering of the plows into plowing position, terminating and commencing the plowing operation along a straight line.

A further object of the invention lies in providing a common actuating means for all of the plow lifting and lowering mechanisms, to give an intermittent movement to this actuating means; and to provide a clutch mechanism which will automatically disengage itself after the actuating means has been operated a predetermined length of time.

The invention further consists in the features of construction and combination of parts hereinafter described and claimed:

In the drawings: Figure 1 is a plan view of the plow equipped with the mechanisms of the present invention; Fig. 2 is a side elevation of the parts shown in Fig. 1; Fig. 3 a face view of the clutch connection between the traction wheels; Fig. 4 a cross section through said clutch connection; Fig. 5 a detail showing the method of mounting the main driving gear of the differential gear; Fig. 6 a plan showing the relative arrangements between the various gear mechanisms which actuate the plow lifting and lowering mechanism; Fig. 7 a plan view of the connection between the actuating shaft for the plow lifting mechanisms and the main driving shaft, and also showing the clutch mechanism for throwing the main driving shaft into and out of driving connection with the actuating shaft; Fig. 8 is a side view of the parts shown in Fig. 7, in this figure, for the sake of clearness, the tooth members have been arranged in the same plane instead of in angular relation as is shown in Fig. 7. This figure also illustrates the clutch connection between the actuating means and the driving shaft therefor and the means for throwing the clutch connection into and out of operative position; Fig. 9 is an enlarged detail showing the clutch connection between the main driving shaft and the toothed member thereon, in operative or clutching position; Fig. 10 a view similar to Fig. 9 showing the clutch out of operative position, and showing in dotted lines the position assumed by the cam member which controls the action of the clutch, when said cam member is moved into position to permit the clutch to again assume a clutching position; Fig. 11 a detail showing the position assumed by the plow and the lifting mechanism therefor while in plowing position and showing in dotted lines the initial position assumed by the plow in the operation of lifting the same; Fig. 12 a view similar to Fig. 11 showing the plow partly lifted; Fig. 13 a view similar to Fig. 11 showing the plow fully lifted and showing in dotted lines the initial position assumed by the plow in the operation of lowering the same; Fig. 14 a view similar to Fig. 11 showing the plow partly lowered; Fig. 15 a cross section on lines 15—15 of Fig. 11 looking in the direction of the arrow; Fig. 16 a side view of one of the gear wheels forming the connection between the actuating member and the plow lifting mechanism; and Fig. 17 a face view of one of the pinions which mesh with the gears shown in Fig. 16.

Referring to the drawings, and more particularly to Fig. 1, the machine as there illustrated, comprises a main supporting frame 20 consisting of side rails 21, a front rail 22, an obliquely disposed rear rail 23, longitudinally extending reinforcing rails 24, and transversely extending reinforcing supporting rails 25. Mounted upon the rail 21 is a shaft 26, on which are mounted a plurality of traction wheels 27, 28, 29 and 30, each of which is provided with a suitable tread surface 30ª. As shown, there are four traction wheels employed, but of course this number might be varied, if desired. Each of the traction wheels is provided with a sleeve 31, (see Fig. 4), and the four traction wheels 27, 28, 29 and 30 have their sleeves loosely mounted on the shaft 26.

The inner of the traction wheels 28 and 29 are connected to the outer of the traction wheels, through the medium of a suitable clutch connection, one form of which is illustrated in Fig. 3, and consists of a tooth-edged member 32, secured to the sleeve of each of the outer traction wheels, a housing or casing 33, secured to the sleeve of each of the inner traction wheels, and a series of rollers or other similar members 34, which, as will be understood from Fig. 3, lie between the outer face of the member 32 and the inner face of the casing 33 when the traction wheels are revolving in one direction, establishing the clutch connection; but if the direction of revolution of the outer traction wheels is reversed, the rollers 34 pass down into the enlarged space 35 between the outer face of the member 32, and the inner face of the casing 33, and thus the friction clutch connection between the inner and outer wheels is broken. This particular style of clutch is old and well known and no claim is made thereto in the present application.

The sleeves of the outer traction wheels 27 and 30 have secured thereto a gear 36 and a gear 37 respectively. The gear 36, meshes with a gear 38, which in turn meshes with a gear 39, on a driven shaft 40, and the gear 37 meshes with a gear 41, which in turn meshes with a gear 42, also on the shaft 40. The shaft 40 is split transversely and at this point is located a differential transmission 41 of any well known and suitable type of construction. This transmission is driven by a main driving pinion 42, on a main driving shaft 43, which shaft is operatively connected to the crank shaft of the motor 44 indicated diagrammatically in Fig. 1.

The main driving pinion as more clearly illustrated in Fig. 5, meshes with a pinion 45, and both pinions are movable with a lever 46, provided with elongated ears or members 47 and 48, the ear 47 serving as a mounting for the pinion 45. A toggle link 49 is slidably mounted on a stationary cross shaft or bar 50, and the sections of the toggle are pivoted at 51, which is the point of connection of the ear 48 with said link. When the lever 46 is thrown into the position shown in dotted lines in Fig. 5, the pinion 45 travels along the surface of the pinion 42, and the pinion 45 is thus brought out of mesh with the surface of the gears forming the differential gear. When the parts reach this position the lever pinions and link can be moved transversely along the cross shaft or bar 50 bringing the pinion 45 into alinement with any desired gear of the differential gear. The lever 40 is then thrown back into the position shown in full lines in Fig. 5, bringing the pinion 45 into mesh with the desired gear of the differential, and the toggle is straightened out, thus locking the gear 45 in such meshing or engaging position. As is well understood, when the pinion 45 is thrown into the central position, it places a direct drive on both of the outer traction wheels and when thrown into either side position, it places a direct drive only on one of said traction wheels. The details of this differential gear operation need not be gone into as they are well understood to any one skilled in the art to which the present invention relates. It will be understood from the foregoing that each of the outer traction wheels and the traction wheel adjacent thereto, constitutes what may be termed a set of traction wheels, and by revolving one of said sets and allowing the other to remain stationary the plow as an entirety will be turned in a certain direction. By this means the traction wheels serve the function of a steering wheel, as well as the ordinary well known functions attributed to traction wheels.

Referring now to the means for automatically raising and lowering the plows, out of and into plowing position: By referring to Fig. 1 it will be seen that the plows are arranged in diagonal order and in stepped relation to one another. It is desirable in operating these plows to have the plowing operation cease and commence at the same point; that is along a straight line, and to accomplish this the plows must be raised and lowered in successive order, as will more fully appear further on in the description. As illustrated in the drawings there are four plows, but it is understood that this number may be varied, as desired. A common actuating mechanism for all of the plow lifting mechanisms is provided which in the construction shown consists of a shaft 78. I provide a lifting mechanism for each of the plows 79, 80, 81 and 82; that for the plows 79 being designated by the numeral 83, that for the plow 80 by the numeral 84, that for plow 81 by the numeral 85, and that for the plow 82 by the numeral 86. All of these raising and lowering mechanisms are alike, and a description of one will be sufficient to fully disclose the construction of all. These mechanisms are shown more clearly in Figs. 11 to 15 inclusive and consist of a crank arm 87 mounted on a cross shaft 88. The crank arm is connected with a bell crank lever 89, one end of which is forked as at 90, Figs. 11 to 15 inclusive, and this forked end underlies and normally engages the plow beams 91 of the plows. The plow beam as shown is made up of two sections, the forward section 92 being pivoted to the rear section 92ª by a pin 93, and the bell crank lever 89 as well as the forward portion 92 of the plow beam, are pivotally mounted on a pin 94 which travels within a slot 95 formed in a member 96 depending from the frame of the machine.

In plowing operations it has been found that the plow will more readily rise out of the ground, if the point is placed upward during this operation, and that the plow will more readily enter the ground, if the point is placed downward during that operation. I have designed the plow lifting mechanism of the present invention so as to move the plows in the above described manner. The various positions assumed by the plow are best illustrated in Figs. 11 to 14 inclusive.

Referring to Fig. 11, the plow in the position there shown in full lines, is in plowing position. When the crank arm 87 is initially operated such initial operation will tend to swing the bell crank lever 89 about its pivot so as to drop the end engaging the plow beam as illustrated in dotted lines in Fig. 11. This will permit the rear end of the plow to lower so that the plow will assume the dotted line position at the commencement of the raising operation, then as the crank arm continues its movement it will effect a bodily raising of the bell crank by reason of the pin and slot connection between the bell crank and the member 96. This will tend to draw the plow bodily upward as indicated in Fig. 12, and said plow will remain in an oblique position with its point turned upward during such movement. As the crank arm reaches its limit of half movement it will pull the bell crank into the position shown in Fig. 13 carrying the plow into the straight position shown in full lines in this figure, so that when fully elevated the plow will be in the same position which it assumed during the plowing operation. As the crank arm starts on its movement to lower the plows the initial movement of the crank arm will raise that end of the bell crank which engages the plow beam, raising the rear end of the plow, and placing the plow in an oblique position with its point downward as indicated by dotted lines in Fig. 13, then upon further movement of the crank arm, the bell crank and the pin to which it is connected will travel downward, the pin traveling in the slot 95, so that the plow will enter the ground point downward as indicated in Fig. 14. When once the plow has contacted the ground, forward movement of the machine will pull it down into the position shown in full lines in Fig. 11; that is in position to again perform the plowing operation. From the foregoing it will be seen that the plows are raised and lowered in the exact manner in which hand plows are raised and lowered, it being well known that the farmer when desiring to raise the plow out of the ground will press down on the handles, elevating the plow point, and when desirous of entering the plow into the ground will raise up on the handles lowering the plow point.

By referring to Fig. 15, it will be seen that the space in the forked end 90 of the bell crank arm is greater than the width of the plow beam and as described the plow beam is in two sections pivotally secured together by the pin 93. This arrangement is to allow of the swinging of the plows when the machine is moved around corners or moved in order to follow the course of the furrows. The shaft 88 of the plow mechanism 83 has attached thereto a pinion 97. The shaft 88 of the mechanism 84 has attached thereto a pinion 98. The shaft 88 of the mechanism 85 has attached thereto a pinion 99 and the shaft 88 of the mechanism 86 has attached thereto a pinion 100. All of these pinions are of a mutilated order and are best illustrated in Figs. 6 and 17. Each consists of a set of teeth 101 and 102 separated by smooth surfaces 103, preferably of a slight concave order. The pinion 97 meshes with a gear 104, the pinion 98 with a gear 105; the pinion 99 with a gear 106; and the pinion 100 with a gear 107. Each of these gears 104, 105, 106, and 107 is keyed or otherwise attached to the shaft 78, and each of the gears is of a mutilated nature as best shown in Figs. 6 and 16. Each consists of a set of teeth 108 and 109 separated by smooth surfaces 110.

By referring to Fig. 6, and assuming the shaft 98 to be turning in the direction of the arrow, it will be seen that the toothed surface 108 of the gear 104 has just started to mesh with the toothed surface 101 of the pinion 97, so that this pinion is about to be revolved, and the crank arm of the lifting mechanism 83 to be operated. It will be seen that the surface 108 of the gear 105 will not come into mesh with the surface 101 of the pinion 98, until the surface 108 of the gear 104 has passed out of mesh with the surface 101 of the pinion 97 thus the plow raising and lowering mechanism 84 will not begin to actuate, until the mechanism 83 has completed its movement; that is assuming the plows are to be raised, the plow 79 will be raised before the plow 80 commences its raising operation. The method of operation previously described, will continue throughout the operation of raising the plows; that is the mechanism 85 will operate after the mechanism 84, and the mechanism 86 will operate after the mechanism 85, so that the plow 79 will first be raised, followed in successive order by the plows 80, 81, and 82, thus by placing the toothed surface 108 and 109 of the gears 104, 105, 106, and 107 in a relative position to one another, so that they come into operation with their respective pinions in successive order, the plows are raised in successive order and each will complete its raising operation at the point where the foremost plows 79 was raised, the plows will, therefore, all terminate their plow operation along a straight line. When it is desired to lower the plows, the toothed surface 109 of the gears 104 to 107 inclusive will bear the same relative relation to the toothed surfaces 102 of the pinions 97 to 100 inclusive as did the surfaces 108 to the surfaces 101 and will come into operation in successive order whereby the plows will be lowered in successive order, the plow 79 first being lowered and followed in successive order by the plows 80, 81, and 82, thus the plows will all commence their plowing operation along a straight line. The action of the toothed surface 108 will swing the crank arm a half revolution or from the position shown in Fig. 11 to that shown in Fig. 13, and the action of the toothed surface 109 will swing the crank arm the other half revolution, or from the position shown in Fig. 13 to that shown in Fig. 11, thus the crank arm continues to move in the same direction, but at each half movement the movement of the bell crank lever 89 is reversed. The smoothed surfaces 103 of the pinions 97 to 100 inclusive are preferably made concave, so that they will ride on the smoothed surfaces 110 and thus hold the pinions in locked position, whereby an engagement between the toothed surfaces of the pinions and toothed surfaces of the gears will always be insured.

The shaft 78 has attached thereto a toothed member 111, and this member is engaged by a toothed member 112. (See Fig. 8.) By referring to this latter figure, it will be seen that the member 111 is provided with eight teeth, and the member 112 with one tooth. One of the plow actuating mechanisms is operated at each turn of the member 111, so that four turns are required to raise, and the same number to lower the plows. The movement of the member 111 is of an intermittent nature; that is, it moves one eighth of a turn then remains at rest until the member 112 has finished a complete revolution. By referring to Fig. 8 it will be seen that the member 111 is provided with concave surfaces 113 between the teeth thereof, which are of a configuration to conform to the periphery of the toothed member 112, so that after the member 111 has moved, it will be locked with respect to the member 112, insuring an engagement between the tooth of the member 112, and the teeth of the member 111 whenever the tooth of the member 112 shall come into position to mesh with the teeth of the member 111.

It is desirable to have the member 111 make its four movements necessary to raise or lower the plow mechanism and then stop, and it is desirable to do this automatically, so that the operator after he has once started the raising and lowering operation, shall have no further need to watch the operation of the machine in order to stop the operation of the raising and lowering mechanisms. The tooth member 112 is driven by the main driving shaft 40, the toothed member, however, is not constantly in engagement with the main driving shaft 40, but a clutch is provided for effecting such engagement, which is best illustrated in Figs. 7 to 10 inclusive. By referring to these figures it will be seen that the hub 113$^a$ of the toothed member 112 is mounted on a collar 114 which is secured by a key 115, or other suitable means to the main driving shaft 40. The collar 114 is provided with opposite diametrical arranged semi-circular recesses 116, best shown in Figs. 9 and 10. It is understood that the collar 114 revolves at all times in unison with the shaft 40, and this collar may be considered to be the continuously revolving element of the clutch connection between the shaft 40 and the toothed member 112. The shiftable element of this clutch connection is in the nature of the rod 117 which extends parallel to the shaft 40 and this rod as more clearly seen in Figs. 9 and 10 is partially cut away for a portion of its length, as at 118 giving to it, for said length, a semi circular formation which is slightly concave on its face 119 whereby said face will register with and ride upon the outer periphery of the collar 114 when it is thrown out of clutching position. Secured to one end of the rod 117 is a link or arm 120 to the free end of which is secured a spring 121 attached to the hub 113 of the toothed member 112. This spring acts normally to hold the rod 117 in position to effect the clutching operation, as will be seen in Fig. 9. The other end of the rod has attached thereto an arm 122 provided with a roller 123. It is understood that both the arms 120 and 122 are keyed or otherwise fixedly secured to the shaft 117 so that they move in unison therewith. As will be understood from Fig. 9 when the arm 120 is pulled down by the action of the spring 121, the shaft 117 will be revolved sufficiently to place the semi circular portion 118 in one of the recesses 116 of the collar 114, and thus effect a clutch connection between said collar and the hub 113 of the toothed member 112. As previously stated, it is desirable to break this clutch engagement after the toothed member 113 has made the necessary movement of the plow raising and lowering mechanisms to effect the raising or lowering of the plows. In the present case four movements are required, although this number would vary in accordance with the number of plows employed. To effect this automatic disengagement of the clutch connection, I have shown a lever or bar 124, which is pivotally secured to a suitable support on the main frame. This lever is provided at one end with a wedge or cam shaped member 125 which has its inner face 126 of a configuration to embrace the shaft 40, and has its outer face 127 of eccentric or wedge formation. When this member 125 is in the position shown in Figs. 8 and 9; that is when it is thrown inward and against the shaft 40, the roller 123 will engage the outer surface 127 of said member, and as the rod and arms are revolved by the action of the shaft 44, and through the medium of the clutch connection between the collar 114 on said shaft and the hub 113 of the toothed member 112, said roller will ride upon the outer face 127 of the member 125 and will be gradually forced outward thus gradually turning the rod 117 until it has been finally brought into the position shown in Fig. 10, in which position the semi circular portion 118 is turned out of the recess 116, so that the face 119 of said portion rests upon the periphery of the collar 114 and thus the clutch connection is broken.

In order to move the member 125 into position to break the clutch engagement, as above described, I provide a cam track way 128 attached to the toothed member 113, and I secure a roller 129 to the other end of the lever 124 from that to which the member 125 is attached. This roller 29 rides in the cam track way 128, and when it has reached the position indicated by the numerals 130 and 131, the lever 124 will be swung so as to bring the member 125 into position to break the clutch connection. This will be clearly understood by referring to Fig. 8. By referring to the drawing it will be seen that the high portions 130 and 131 of the cam track way 128 are arranged so as to be brought into operative position relative to the rollers 129, whenever the toothed member 113 shall have made a one half revolution, or in other words when it shall have been moved four steps, the necessary amount to effect the raising or lowering operation of the plows. Thus after the connection has been made it will remain made while the member 113 has been moved four steps, and will then be automatically broken, and the raising and lowering operation of the plows discontinued. In order to again make the clutch connection after it has been broken, the operator pulls a lever 132, which rocks the pivoted bar 124, raising the roller 129 into the dotted position shown in Fig. 8, and lowering the member 125 into the dotted position as shown in Figs. 8 and 10. This lowering of the member 125 will force the roller 123 off from engagement with the surface 127, as will be clearly understood from Fig. 10. This will leave the arm 122 free to swing, and when the shaft 40 revolves sufficiently to bring one of the notches 116, into alinement with the semi circular portion 118 of the rod 117, the tension of the spring will cause said rod to turn positioning the portion 118 within the recess 116, or into the position shown in Fig. 9 and the clutch connection is thus reëstablished.

It will be seen from the foregoing that the movements necessary to break the clutch engagement between the main drive shaft and the member 112 are operated by the movement of the member 113, and by this arrangement a correct timing of the movements of the member 113 is always insured.

I claim:

1. In a traction plow, the combination of a supporting frame, plows on said frame, a vertically slidable L-shaped lever for each plow, having one end engaging the plow beam, and means operatively connected for actuating said levers to raise and lower the plows, substantially as described.

2. In a traction plow, the combination of a supporting frame, plows on said frame, a vertically slidable L-shaped lever for each plow, one end engaging the plow beam, actuating means for said levers, and a crank arm connection between said actuating means and the other end of the lever, substantially as described.

3. In a traction plow, the combination of a supporting frame, plows on said frame, a vertically slidable L-shaped lever for each plow, one end engaging the plow beam, actuating means for said levers, a crank arm connection between said actuating means and the other end of the lever, and gear mechanism for operating said crank arm, substantially as described.

4. In a traction plow, the combination of a supporting frame, a slidable L-shaped lever for each plow, having one end engaging the plow beam, means for actuating said levers to raise and lower the plows, a pivot for each plow beam, permitting it to swing in a horizontal plane, and that end of the L-shaped lever engaging the plow beam being arranged to permit of such swinging movement, substantially as described.

5. In a traction plow, the combination of a supporting frame, plows on said frame, a pivoted and vertically slidable L-shaped lever for each plow, one end of said lever engaging the plow beam, and means operatively connected for actuating said levers to give the end engaging the plow beam an initial downward movement, then raising the lever bodily upward, then giving said engaging end an upward movement, and then lowering the lever bodily downward, substantially as described.

6. In a traction plow, the combination of a supporting frame, a series of plows on said frame, a series of slotted members attached to the frame, one for each plow, a pin traveling in the slot of each member, an L-shaped lever pivoted to each pin and having one end arranged to engage the beam of the plow with which it is associated, a pivotal connection between the end of each plow beam and the pin associated therewith, and means operatively connected for actuating said lever to raise and lower the plow beams, substantially as described.

7. In a traction plow, the combination of a supporting frame, a series of plows on said frame, a series of slotted members attached to the frame, one for each plow, a pin traveling in the slot of each member, an L-shaped lever pivoted to each pin and having one end arranged to engage the beam of the plow with which it is associated, a crank arm connected to the other end of each lever, a pivoted connection between the end of each plow beam and the pin associated therewith, and means operatively connected for actuating said crank arm to raise and lower the plows, substantially as described.

8. In a traction plow, the combination of a supporting frame, a series of plows on said frame, a series of slotted members attached to the frame, one for each plow, a pin traveling in the slot of each member, an L-shaped lever pivoted to each pin and having one end arranged to engage the beam of the plow with which it is associated, a pivotal connection between the end of each beam and the pin associated therewith, a gear mechanism associated with each lever, and means for operating said gear mechanisms, substantially as described.

9. In a traction plow, the combination of a supporting frame, a series of plows on said frame, a series of slotted members attached to the frame, one for each plow, a pin traveling in the slot of each member, an L-shaped lever pivoted to each pin and having one end arranged to engage the beam of the plow with which it is associated, a pivotal connection between the end of each plow beam and the pin associated therewith to permit movement of the plow beam in a vertical direction, a pivotal connection between the front and rear portions of the beam to permit movement of the plow in a horizontal direction, and means operatively connected to said levers for actuating the same to raise and lower the plow bodies, substantially as described.

10. In a traction plow, the combination of a supporting frame, a series of plows on said frame, a series of gear mechanisms, one for each plow, a crank arm for each gear mechanism, a shiftable lever for each crank arm, each lever being connected at one end to the crank arm and having its other end engaging a plow, each lever acting to raise and lower the plow with which it is associated, substantially as described.

WILMER G. BUCK.

Witnesses:
FRANK ELLIOTT,
ROBERT MENEELY.

---

Copies of this patent may be obtained for five cents each, by addressing the "Commissioner of Patents, Washington, D. C."